Patented Aug. 28, 1923.

1,466,644

UNITED STATES PATENT OFFICE.

RICHARD FRANCHOT, OF NIAGARA FALLS, NEW YORK, AND KARL P. McELROY, OF WASHINGTON, DISTRICT OF COLUMBIA, ASSIGNORS TO FERRO CHEMICALS INC., OF WASHINGTON, DISTRICT OF COLUMBIA, A CORPORATION OF DELAWARE.

IRON SMELTING.

No Drawing. Application filed June 5, 1920. Serial No. 386,777.

*To all whom it may concern:*

Be it known that we, RICHARD FRANCHOT and KARL P. MCELROY, citizens of the United States, residing at Niagara Falls, New York, and Washington, District of Columbia, have invented certain new and useful Improvements in Iron Smelting, of which the following is a specification.

This invention relates to iron smelting; and it comprises a method of producing pig iron and ferro alloys wherein iron ore, flux and a definitely limited proportion of coke are charged into a blast furnace of the usual type and are caused to descend through the shaft in the usual way, against a countercurrent of ascending gases, to the hearth where a temperature sufficient to form freely running slag of the usual lime-silica-alumina types is maintained by combustion of carbon with a blast, using highly heated air, in large volume relative to the coke charged, the quantity of the gases from the hearth allowed to ascend through the shaft being so proportioned relative to the descending charge that the sensible heat and reducing power of such ascending gases are utilized in any desired degree while the remainder of the gases constituting a substantial portion of the hearth gases and carrying vapors and fumes of saline substances, is diverted from the bosh or the lower portions of the shaft and used for heating air blast, the quantity of gas produced in the hearth and the ratio of fuel carbon in the charge being proportioned to the blast temperature and positive regulation of the operation of the furnace being secured by adjustment of the quantity of gas and salines diverted; or by cooling the diverted gas and returning a regulated quantity to the shaft; all as more fully hereinafter set forth and as claimed.

For the purposes of this invention the blast furnace may be considered as consisting of two separate and distinct pieces of apparatus with different functions—the hearth and the shaft. The primary function of the hearth is to superheat metal and slag forming materials delivered to it by the superimposed shaft, to complete the reduction of the metal constituents and to fuse and separate the liquid metal and slag in order that they may be drawn off. The heat used in the hearth is derived from the combustion of carbon to CO, with the oxygen of the air blast, supplemented by the heat of the blast and that of downcoming materials. The hearth has a secondary function which is to produce highly heated reducing gas which is delivered to the shaft to be used in the shaft functions. These are, mainly, the reduction of metallic oxids, the calcining of the flux carbonates and the preheating of the materials for the hearth. The temperature of the hearth is, usually, from 1400° to 1500° C. and the heat used in the hearth must be available at these temperatures. Expressed in another way: Only that portion of the heat of combustion of carbon corresponding to the range of temperature between the hearth temperature and the theoretical combustion temperature, is available for the hearth work. In usual practice, therefore, in order to obtain the quantity of high temperature heat required by the hearth, much more carbon is burned in the hearth and much more hot gas is produced than is required for work to be done in the shaft. The shaft is flooded with hot gas and with free and latent energy. The result is that a large part of the energy of carbon charged into the furnace either passes out of the top as unutilized CO or is lost as sensible heat in the gas. In most cases, and especially in the manufacture of ferro-manganese and ferro-silicon, a substantial part of the carbon charged as coke is gasified to CO by ore oxygen and by the $CO_2$ of limestone and fails to reach the hearth where it is primarily needed. The efficiency of utilization of the fuel is correspondingly poor; seldom is it as high as 50 per cent of the theoretical; in other words the fuel coke used is, usually, more than twice the quantity theoretically required. Uniformity of operation is difficult to maintain, on account of lack of means for positive regulation and is only secured by using the large excess of fuel above indicated.

We have discovered that by proportioning the fuel coke in the charge in accordance with certain theoretical requirements both for smelting a given ore and flux and for producing any desired quantity of gas in the hearth over shaft requirements and by limiting the quantity of gas allowed to ascend the shaft by diverting a portion of the gas at low points, the operation of the furnace can be made smooth and uniform at any desired rate of driving. We have furthermore found that when gas is diverted from the lower shaft an increase of the volume of blast relative to the quantity of coke charged further improves the production until a point is reached where substantially more air is being blown than corresponds with the theoretical quantity of oxygen necessary to convert the carbon of the coke, less that in the metal, to CO. We have also found that this excess of air over the theoretical may be still further increased when the quantity of gas diverted is increased and a portion of this diverted gas, after cooling, is blown into the shaft. We likewise have discovered that the diversion of gas, when continued for some time, has the effect of reducing the need for the excess of carbon in the hearth over that needed, as gas, in the shaft, and that we can reduce the blast temperature, accordingly. By this diversion the furnace is stripped of salines. By adjusting the three factors, blast volume, quantity of gas diverted and quantity of diverted cooled gas returned, in conjunction with a fourth factor, blast temperature, we are able to secure positive regulation of the furnace to compensate for changing conditions in the operation.

The terminal work of smelting iron from given materials that is, the quantity of heat, or energy, that must be supplied to the furnace and usefully applied in order to maintain the operation of the furnace, can be calculated from factors that are known or that can be readily determined in individual cases. Much of the energy required is absorbed in well understood endothermic chemical reactions and much is used in physical heating of the materials produced and delivered by the furnace; and persons skilled in the art can, as stated, closely estimate the theoretical requirements of energy in the smelting operation. As an example illustrative of the principles involved in the present invention it is convenient to consider the production of pig iron containing 4 per cent carbon, 2 per cent of silicon, phosphorous, sulfur and manganese taken together, and 94 per cent iron, from hematite ore and limestone in the proportions of 2 pounds ore and 0.7 pounds stone making 1 pound slag per pound of pig iron. For convenience, the constituents of the pig iron beside iron and carbon will be treated as if they were 2 per cent silicon alone and the formation of calcium sulfid in the slag will be neglected as also the evaporation of moisture from the charge. The energy in pound-centigrade heat units or calories, required in producing one pound or kilogram of such pig iron from these materials may be summarized

|  | Heat units. |
|---|---|
| Reduction of 0.94 lb. Fe from $Fe_2O_3$ | 1641 |
| Calcining 0.7 lb. $CaCO_3$ | 315 |
| Reduction of 0.02 lb. Si from $SiO_2$ | 140 |
| Heating 1 lb. molten metal | 330 |
| Heating 1 lb. molten slag | 550 |
|  | 2976 |
| Less: |  |
| Heat of formation 1 lb. slag | 90 |
| Heat of formation of $Fe_3C$ from 0.04 carbon | 28 |
|  | 118 |
|  | 2858 |

That is, the total useful work performed in this smelting operation is equivalent to 2858 centigrade heat units per pound of metal. There are, in addition certain inevitable heat losses, in cooling water, radiation, etc. which are, for a given furnace and a given temperature, a constant function of time and vary, per pound of metal, inversely with the speed of production. The cooling and radiation factor, requiring a certain expenditure of fuel, changes with conditions and as it is, for present purposes, not vital, it may be assumed to be 800 heat units per pound of metal of which 500 units are assumed to be required in the hearth and 300 units in the shaft, making the total work 3658 units per pound of metal. Theoretically, energy for this work could be supplied by the complete combustion (to $CO_2$) of 0.45 pounds carbon which would, including 0.04 pound carbon in the metal, indicate a theoretical consumption of 0.55 pounds of coke of 90 per cent fixed carbon per pound of metal. Usually, however, in practice, the coke consumption is nearly double this figure, with ore and metal of this quality, showing an efficiency of about 50 per cent. The low efficiency can be attributed to the fact that only about one third of the fuel carbon is oxidized to $CO_2$, the heat brought in with the blast being usually, out-balanced by that lost as sensible heat in the top gases. Large heat losses usually occur in utilizing the waste gases from the furnace.

It is an object of the present invention so to correlate the application of fuel energy to the work to be done, that the losses of energy, both free and latent, in the operation of the blast furnace, shall be reduced to a minimum.

Of the work involved in smelting iron and ferro alloys, as a matter of theory, all except possibly, the reduction of silica, etc., can be done at temperatures below 1400°. The useful work at and above 1400° consists largely of maintaining the temperature against cooling and radiation. The useful hearth work in the example is estimated to be 140+500=640 units per pound of metal and the shaft work, 3018 units. The hearth work is some 17 per cent of the total.

The combustion of 1 pound carbon to CO, as it takes place in the hearth of the blast furnace, requires 5.63 pounds of air carrying 1 per cent moisture. With the carbon preheated in the shaft to the hearth temperature of, say, 1400° C. the heat is 2430+580 or 3010 units per pound carbon. At this temperature, however, the 6.63 pounds gas (CO and $N_2$) produced carries away 2505 units, leaving only 505 units available for work at the temperature named. This is, according to the usual authorities on mean specific heats, the amount of heat corresponding to the range from the theoretical combustion temperature down to the hearth temperature 1400°. Of the 505 units available at 1400°, 181 units are absorbed in the decomposition of 0.0563 pounds $H_2O$ vapor carried in the air blast, leaving 324 units available for hearth work proper. This is only 4 per cent of the 8100 units of the total combustion energy of 1 pound carbon. There is, however, to be added to it the sensible heat of the air blast.

The following table shows, for each 100° blast temperature from 0 to 100° C. the corresponding heat of the blast, the heat available at 1400° and the ratio of this heat to the total energy, all on a basis of 1 pound carbon burned with air (1 per cent moisture) to CO in the hearth, the total energy being the heat brought in by blast plus the theoretical total combustion heat of the carbon.

*Per pound of carbon burned in hearth by air.*

| Blast temperature. | Blast heat. | Available at 1400° C. | Percentage of total energy. |
| --- | --- | --- | --- |
| 0° C | 0 heat units | 324 heat units | 4.0 |
| 100° C | 130 heat units | 454 heat units | 5.5 |
| 200° C | 270 heat units | 594 heat units | 7.1 |
| 300° C | 409 heat units | 733 heat units | 8.6 |
| 400° C | 550 heat units | 874 heat units | 10.1 |
| 500° C | 692 heat units | 1016 heat units | 11.5 |
| 600° C | 839 heat units | 1163 heat units | 13.0 |
| 700° C | 988 heat units | 1312 heat units | 14.4 |
| 800° C | 1138 heat units | 1462 heat units | 15.8 |
| 900° C | 1292 heat units | 1616 heat units | 17.2 |
| 1000° C | 1448 heat units | 1772 heat units | 18.6 |

The table shows that even with the highest blast temperatures now used only some 19 per cent of the energy applied to the furnace is available at 1400° C. and with an easily attained blast temperature of, say, 500° C. the available heat in the hearth, at 1400°, is but 12 per cent of the total energy. The balance of the fuel energy is carried in the gas passing from the hearth and it consists of the sensible heat of the gas at the hearth temperature and the latent combustion energy of CO. The energy applicable to the shaft work is this sum lessened by the heat absorbed by the carbon in being heated to the hearth temperature by the gas. The energy applied to the shaft work is, then, with a hearth temperature of 1400°, 2505+5670—580 or 7595 units per pound carbon in the gas or per pound carbon burned with air in the hearth. This shaft energy is constant per pound carbon no matter what the blast temperature may be and the ratio of hearth heat to total energy varies directly with the blast temperature. The increase in ratio is about 1.5 per cent of the total energy for each 100° rise of blast temperature. When the hearth work, as in the example cited, amounts to 17 per cent of the total work, at all blast temperatures below 900° the ratio of hearth heat is out of proportion to that of hearth work and in order to meet the demand for work in the hearth an amount of carbon must be burned in the hearth which is in excess of the amount sufficient (in hearth gas) for the shaft work. This excess of carbon in the hearth over the requirement of carbon gas in the shaft varies inversely with the blast temperature, and with a given blast temperature, other factors remaining constant, the excess of gas produced in the hearth over shaft requirements is a constant quantity. With the usual practice, to increase the blast temperature however beyond a certain point is simply to increase the amount of carbon necessary in the charge.

The full combustion energy of the hearth gas going up the shaft is available for the shaft work only in so far as oxygen is supplied by the solid materials of the charge to convert CO to $CO_2$. In producing from hematite ores a pig iron containing 94 per cent Fe and 2 per cent Si, the oxygen going into the gases from the ore, and associated with the reduced iron and silicon in the pig is about 0.43 lb. per pound pig, being sufficient to oxidize 0.32 C from CO to $CO_2$, and beyond this, oxygen for the conversion of CO to $CO_2$ in the shaft can be supplied only by CO from the hearth in the reaction by which 2CO give C and $CO_2$ with development of 38880 calories; one equivalent of CO being reduced to carbon while oxidizing another equivalent to $CO_2$. This reaction, as is well known, takes place in the shaft concurrently with the reduction of oxids and the calcination of carbonates, but in prior practice the high temperature conditions, that is, the oversupply of free energy, cause a reversal of the reaction to such an extent that the deposition of carbon is overbalanced by its gasification to CO and there is a substantial net loss of carbon by "solution" or oxidation in the shaft. In this invention, by limiting the quantity, and, if desired, the temperature of hearth gas flowing through the shaft, the supply of free energy (sensible heat) is limited and the latent energy of CO is developed both in reducing oxids and in reducing itself. We therefore consider the latent energy of the hearth gas to be that of the reaction $2CO = C + CO_2 + 38880$ calories; which is 1620 heat units per pound of carbon contained in the gas as CO. The total energy of the gas from the hearth is then, at 1400° 1925+1620 or 3545 units per pound and in developing this energy there is deposited 0.5 pound C for each pound of carbon as CO undergoing the reaction, the other half of such CO being converted to $CO_2$. The deposited carbon is available for reduction of metals by which carbon is oxidized with absorption of heat, being converted both to CO and $CO_2$, the relative quantities of each depending upon the temperature conditions. Obviously 2CO formed in reduction of iron, silicon, etc. in the hotter zones can break up into C and $CO_2$ in the upper cooler regions as well as does the CO formed from air oxygen in the hearth. It is immaterial, so far as net results are concerned, whether $Fe_2O_3$, for instance, oxidizes 3CO to $3CO_2$ directly, or first oxidizes 3C to 3CO which then reacts with an additional 3CO to give 3C and $3CO_2$. Likewise it is immaterial whether $Fe_2O_3$ reacts with 1.5 C to give 1.5 $CO_2$ or first reacts with 3C, the 3CO formed then breaking up into 1.5 C and 1.5 $CO_2$, or with 2C to yield CO and $CO_2$ with subsequent decomposition of CO to 0.5 C and 0.5 $CO_2$. The object of the present invention is to improve efficiency by oxidizing carbon to $CO_2$ instead of only to CO and in doing this and at the same time maintaining reducing conditions, we utilize in the shaft a minimum of free energy and a maximum of latent energy through deposition of carbon from CO. Therefore, in order to coordinate the work with the energy supply we credit against the thermal requirements the heat of formation of $CO_2$ from solid carbon equivalent to the ore oxygen. This amounts to crediting against the work the energy of the oxygen of the ore. In the example the ore oxygen is sufficient to convert 0.16 C to $CO_2$ and the total requirements become 3658—1296=2362 units, of which 1722 are considered to be needed in the shaft and 640 in the hearth. The shaft then requires theoretically $\frac{1722}{3545} = 0.48$ C as CO. One half of this, or 0.24 C is, potentially, deposited and of this the ore oxygen can oxidize 0.16 C to $CO_2$ leaving a net deposition of 0.08 C and conversion of 0.24+0.16=0.40 C to $CO_2$. This is exactly the same as if the ore oxygen oxidized 0.32 C from CO to $CO_2$ and in addition 0.16 C as CO broke up, depositing 0.08 C and forming $CO_2$ equivalent to 0.08 C. It is also the same as if the ore oxidized 0.32 C to CO and this with the 0.48 C as CO from the hearth, deposited 0.40 C with conversion of 0.40 C to $CO_2$. Essentially, the amount of $CO_2$ formed in the shaft depends upon the balance between the deposition of carbon in the reaction $2CO = C + CO_2$ going to the right and carbon gasification or "solution" by the reversal. As stated, the controlling factor is the supply of free energy which, if large as in prior practice, under the counter-current recuperation of heat as it takes place in the blast furnace, carries the zone of high heat nearly to the top (no matter how tall the stack) with consequent high gasification and small development of latent energy of CO until contact with the cold charge at the top causes an absorption of heat and a quick formation of $CO_2$ with loss as sensible heat in the top gas of a substantial part of the heat which is credited to this formation. Good counter-current principles are violated in that the entering charge meets at once a hot rich gas. In the shaft the requirements of energy are definite for a given ore and any excess over requirements is simply not utilized. In this invention, we so proportion the gas going up the shaft to the work done in the shaft that any desired percentage of the energy of such gas is utilized and we utilize, usually at least 50 per cent of the latent combustion energy of the gas going through the shaft as compared with the usual 30 per cent or so.

In the usual practice the heating difficulties are accentuated by the accumulation of volatile salines which rob the hearth of heat, carrying it up into the shaft where it is not needed, while limiting the proportion of the heat available in the hearth which is applicable to the smelting work proper and hence setting a limit to the burden.

In proportioning the burden of the coke, we first estimate the hearth and shaft requirements in smelting a particular ore, and flux in accordance with the foregoing theoretical considerations. We then choose a blast temperature which will cause a substantial production of gas in the hearth in excess of shaft requirements, calculating the carbon required in the hearth corresponding to this temperature. The excess of gas is diverted at or near the hearth and may be in any amount desired, either for heating the blast, for burning in boilers or for other purposes. Ordinarily we produce sufficient gas for the stoves and boilers.

From the hearth carbon, calculated as above indicated, we deduct the net amount estimated as being deposited in the shaft in developing the full latent energy of the CO required there. This gives the amount of carbon to be charged as fuel relative to the metal produced. Adding to this the carbon for the metal and dividing by the carbon content of the coke used gives the coke ratio and hence the proportion of burden. In the example given 640 heat units are estimated as being the hearth work per pound of metal and 0.48 pound C. as the theoretical shaft requirement. With blast at 400°, as shown by the table 640 units will be available in the hearth from 0.73 C. while at 500°, 0.63 C. will suffice. The excess over 0.5 C. for the shaft is respectively, 0.23 and 0.13 and the blast heats 402 and 436 units. The heating value of the gas is, as it leaves the hearth, 2505 plus 5670 or 8175 units per pound contained carbon, so that the smaller amount of excess hearth gas (0.13 C.) has a heating power of 1062 units which at 41 per cent efficiency of use will give the 436 units needed for the blast; the sensible heat alone of the gas containing 0.23 C. is 576 units, which in an efficient regenerator or recuperator would supply 402 units of blast heat. With blast at 450°, 0.68 C. in the hearth would leave ample margin for heating the blast and for additional gas in the shaft (a slight correction is necessary in shaft requirements to include heating carbon for the hearth corresponding to the diverted gas). The hearth carbon then may be taken at 0.68 per pound metal. The net deposition in the shaft from gas containing 0.52 C. will be 0.1 C. This leaves 0.58 C. as the required fuel and including 0.04 C, for the metal, indicates a charge of 0.7 pounds of 90 per cent coke per pound of pig iron. In this case gas containing 0.16 C. from the shaft, or about 23 per cent of the hearth gas, may be diverted. The fuel charge of 0.58 carbon is about 1.65 times the 0.35 pounds carbon required, with complete combustion to $CO_2$ to provide the 2858 heat units which is the theoretical energy absorption in producing 1 pound of the metal. We have found that the fuel carbon required is never more than twice this theoretical requirement.

Working in this way there are afforded several means of positive regulation of the furnace operation. If there is a deficiency of heat in the hearth we may increase the blast temperature. We have found, however, that the diversion of gas removes from the hearth a burden which otherwise would devolve upon it, namely the volatilization and decomposition of alkalis which are present in small quantity in almost all the materials used in iron production and which accumulate in the furnace owing to their volatilization from the hearth and condensation and absorption in the descending charge. The concentration of alkalis carried in the gas in the lower zones, especially near the tuyères, has been found to be substantial in many furnaces and, as stated, they add materially to the hearth work in being repeatedly volatilized and decomposed with formation and decomposition of cyanids as they circulate between hearth and shaft, absorbing energy at a high temperature and giving it up in decomposition and condensation at lower temperatures, thus increasing the ratio of hearth work to the total work, or in other words absorbing a substantial proportion of the heat available in the hearth, thus limiting the proportion thereof applicable to the smelting work proper and hence setting a limit to the burden upon the hearth. We abstract these alkalis and cyanides as vapor and fumes in the diverted gases, thus preventing or limiting their accumulation, lightening the load upon the hearth and hence reducing the necessity for a very large excess of hearth carbon over shaft requirements, or conversely, permitting of an increase of burden relative to the carbon burned in the hearth and hence of an increase of production without increase of air volume (rate of driving) or blast temperature. We have in fact found that, in applying the present invention to furnaces which have been in blast for some time, the blast temperature could, after some time, be gradually lowered. This constitutes a reduction of hearth heat and may be attributed to the abstraction of salines, in the diversion of hot gas, preventing or reducing the accumulation of such substances with consequent lowering of the hearth heat requirements, or in other words increasing the proportion of the hearth heat available for the heating of metal and slag and other useful work. With small amounts of diverted gas, or if the temperature of the gas diverted is relatively low, say 1000° C. or below, it is advisable to choose ores and other charge materials as low in alkalies as possible.

In actual operation the diversion of gas may be controlled in accordance with the top temperature, the $CO_2$ rotio in the top gas, and the requirements of gas for heating the blast. Ordinarily, as stated, we so adjust the coke ratio in the charge that there is a substantial excess of carbon in the furnace over theoretical requirements; the quantity of gas diverted may then be so adjusted, that the energy of the gas going through the shaft is, substantially, fully utilized as evidence by the top gas being nearly free of CO and of about the same temperature as the entering stock. Any desired degree of utilization, short of 100 per cent, may be attained, and with even the most refractory ores and in the highest grade ferro alloys, we divert gas until the volume ratio of $CO_2$ : $CO$ in the top gas is at least 40 :60 and the top temperature is at most 250° C. In fast driving any of the work of reduction and calcination and preheating which is not accomplished in the shaft devolves upon the hearth and changes the ratio of hearth work to shaft work. Such changing conditions can be compensated by increase or decrease of blast temperature and in the present invention, other things being equal, the diversion of hot rich gas makes it possible to use blast temperatures much in excess of those found practicable in prior practice, thus increasing hearth heat without increase of carbon burned by air. The diversion of gas makes it possible to use the high blast temperatures without increasing top heat and lowering the top $CO_2$ ratio. With the diversion of gas we also, as above noted, increase the volume of air blown relative to the coke charged, which is the converse of decreasing coke relative to air volume. In the present invention more carbon is returned to the hearth and less need be charged. In prior practice a blast volume of 70 cubic feet per pound of fuel carbon (coke carbon, less carbon in metal) has never been attained on account of gasification or oxidation by ore oxygen and flux $CO_2$; with no shaft gasification or solution of carbon, that is, with an exact balance between gasification and deposition, all of the carbon charged as fuel reaches the hearth to be burned with air and 71.4 cubic feet of dry air (0° and 760 mm.) can be blown per pound of carbon or 70.7 cubic feet air with 1 per cent moisture. With great deposition of carbon however, as in the present invention, that is, when deposition outbalances gasification or "solution," more carbon is burned in the hearth than is charged as fuel and the volume of air is proportionately increased over that corresponding to the charge of fuel carbon and we may blow from 70 to 90 cubic feet (0° and 760 mm.) per pound of fuel carbon charged at the top. We have in this possible variation of blast volume a valuable means of regulation and in connection with the diversion of gas, the hearth heat can be controlled independently of the shaft.

The deposition of carbon for return to the hearth can be materially increased by lowering the temperature of the gas going up the shaft and increasing its quantity. This may be done, if desired, by increasing the quantity of gas diverted, cooling (as by heating the air blast) and returning cooled gas to the shaft. Working in this way, free energy in the hearth gas which otherwise is available for shaft work is transferred to the air to become available in the hearth and is replaced in the shaft by the development of latent energy of CO in the deposition of carbon.

The diversion of gas may be accomplished in any convenient way, but we find that a satisfactory method is by means of openings in the furnace wall arranged at a number of points in the circumference and delivering into an annular chamber or conduit similar to a bustle pipe from which the gas is led in suitable conduits to a place of use. The diversion may be from any level of the furnace; good results are obtained when the diversion is made from the lower shaft just above the bosh where the temperature of the gas is from 1000° to 1200° C., but sometimes a part of the gas is taken from the bosh within a few feet of the tuyère level. The lower the level of diversion, the higher the temperature and the less gas needs to be taken off to keep down the accumulation of alkalis and to supply heat for the blast.

What we claim is:—

1. In the operation of a blast furnace producing iron and ferroalloys, the diversion from the lower portion of the shaft, of hot reducing gases in quantity sufficient to cause a substantial net deposition of carbon from the gases in the shaft; that is, the deposition of more carbon than is there gasified.

2. The process of smelting iron and ferroalloys from their ores which comprises charging such ores and suitable fluxes into a blast furnace together with a quantity of coke supplying the carbon necessary to furnish that contained in the metal together with that which, when entirely converted to $CO_2$ develops not more than twice the energy sufficient for the theoretical requirements of the smelting operation, causing such charge to descend through the furnace against a counter-current of ascending gases produced by combustion of carbon to CO with a blast of heated air and limiting the quantity of such ascending gases, relative to the descending charge, to that containing not more than twice the CO theoretically required when completely oxidized to $CO_2$, to convert the reducible oxids of such charge to metal while diverting the excess of gas over such requirement from the shaft at a level near the base of the shaft.

3. In the operation of blast furnaces producing pig iron and ferroalloys, the process which comprises allowing a portion of the hearth gases to ascend through the shaft while diverting a regulated portion, and so adjusting the relative proportions of the ascending and diverted gases that the volume of CO : $CO_2$ in the top exit gas is not greater than 60 : 40.

4. In the operation of blast furnaces producing pig iron or ferro-alloy the process which comprises allowing a portion of the hearth gases to ascend through the upper shaft while diverting another portion therebelow the volume so diverted being sufficient to cause a net carbon deposition in the shaft, and blowing the hearth region with a volume of air greater than 70 cubic feet per pound of carbon charged into the furnace.

5. In the operation of blast furnaces producing iron or ferro-alloy the process of increasing the economy of operation which comprises diverting a regulated portion of the hot gases directly from the hot zone, said regulated portion so diverted being in amount sufficient to prevent the accumulation of any substantial concentration of salines in the furnace.

6. In the operation of blast furnaces producing iron and ferro alloys, the process which comprises diverting a sufficient amount of hot hearth gases from the lower portion of the apparatus to ensure a temperature not exceeding 250° in the residual gases emerging from the top of the apparatus.

7. The method of regulating the operation of blast furnaces which comprises diverting hot gases from the hotter zone and adjusting the quantity of gas so diverted in accordance with the temperature and $CO_2$ ratio of the top exit gas, increasing the diversion to lower said temperature and raise said $CO_2$ ratio and decreasing the diversion to raise said temperature and lower said $CO_2$ ratio.

8. In the operation of blast furnaces making iron or ferro-alloy the process of producing high grade producer-gas which comprises charging an excess of fuel over that required in the smelting operation while diverting a regulated quantity of hot gas from the lower part of the furnace and transferring its sensible heat to the air blast.

9. In the smelting of ores and ore mixtures with carbonaceous fuel in the blast furnace to produce iron or ferro-alloys with simultaneous production of high grade producer gas by diversion of a regulated amount of gas from the hot zone of the furnace, the process of controlling the operation which comprises proportioning the amount of fuel charged and the amount of gas produced, according to the temperature of the blast, the amount of fuel charged and of gas diverted being increased with a drop in blast temperature and the amount of fuel charged and of gas diverted being decreased with an increase in blast temperature.

10. In the operation of blast furnaces making iron or ferro alloy the process which comprises diverting a regulated quantity of hot gas from the hot zone, cooling said diverted gas and returning a regulated quantity of said cooled diverted gas to the furnace shaft.

11. In a smelting of iron and ferro alloys with carbonaceous fuel the method of improving fuel economy which comprises developing in the furnace a maximum proportion of the combustion energy of the gases produced in the hearth by regulating the volume and temperature of such gases put through the shaft.

12. In the operation of blast furnaces producing iron and ferro alloys the method of controlling the application of fuel energy to the smelting work which comprises withdrawing a regulated volume of gases from the hotter zone of the furnace, adjusting the volume of hot gases put through the shaft to conform to the requirement of heat and reducing energy therein.

13. In iron and ferro alloy smelting the method of making an increased proportion of the hearth heat available for heating the metal and slag to high temperatures which comprises limiting the accumulation of salines in the furnace by diverting a regulated volume of gases from the hot zone.

14. In the smelting of ores with coke and hot air in the blast furnace to produce iron or ferro-alloy with diversion of a regulated volume of gas from the hot zone of the furnace the method of increasing the burden upon the coke which comprises proportioning such burden according to the blast heat, increasing the burden with rise of blast temperature and decreasing the burden with drop in blast temperature.

15. In the smelting of iron ores in the blast furnace the process which comprises withdrawing from the furnace at the hot zone a regulated proportion of the saline-vapor-laden gases produced there while adjusting the ore burden in correlation with the proportion of hot gases so withdrawn.

16. In the operation of blast furnaces making iron or ferro-alloy the process of limiting the accumulation in the furnace of volatile substances and increasing metal production which comprises withdrawing from a furnace a regulated proportion of the gases at temperatures above 1000° C. and adjusting the burden in correlation with the amount and temperature of the withdrawn gases.

In testimony whereof, we affix our signatures hereto.

RICHARD FRANCHOT.
K. P. McELROY.